United States Patent [19]

Laor

[11] Patent Number: 5,524,153
[45] Date of Patent: Jun. 4, 1996

[54] OPTICAL FIBER SWITCHING SYSTEM AND METHOD USING SAME

[75] Inventor: Herzel Laor, Boulder, Colo.

[73] Assignee: Astarte Fiber Networks, Inc., Boulder, Colo.

[21] Appl. No.: 386,943

[22] Filed: Feb. 10, 1995

[51] Int. Cl.[6] ............................................. G02B 6/26
[52] U.S. Cl. ........................... 385/16; 385/15; 385/17; 385/20; 385/24; 385/31; 385/33; 385/39; 385/52; 385/126; 385/127
[58] Field of Search ........................ 385/12, 14, 15, 385/16, 17, 20, 24, 25, 27, 31, 33, 39, 42, 48, 52, 123, 126, 127, 147

[56] References Cited

U.S. PATENT DOCUMENTS

| | | | |
|---|---|---|---|
| 3,445,666 | 5/1969 | Snaper | 250/211 |
| 3,732,425 | 5/1973 | Ellert et al. | 250/217 S |
| 3,938,895 | 2/1976 | Bridger et al. | 356/152 |
| 4,220,396 | 9/1980 | Antell | 385/15 X |
| 4,302,071 | 11/1981 | Winzer | 385/42 X |
| 4,303,302 | 12/1981 | Ramsey et al. | 385/16 X |
| 4,365,863 | 12/1982 | Broussaud | 385/17 X |
| 4,378,144 | 3/1983 | Duck et al. | 385/15 X |
| 4,432,599 | 2/1984 | McMahon | 385/12 X |
| 4,452,506 | 6/1984 | Reeve et al. | 385/52 X |
| 4,470,662 | 9/1984 | Mumzhiu | 385/15 X |
| 4,474,423 | 10/1984 | Bisbee et al. | 385/52 X |
| 4,512,036 | 4/1985 | Laor | 385/24 X |
| 4,651,343 | 3/1987 | Laor | 385/24 X |
| 4,653,849 | 3/1987 | Boirat et al. | 385/17 |
| 4,677,290 | 6/1987 | Mitch | 250/227.11 X |
| 4,696,062 | 9/1987 | LaBudde | 356/138 X |
| 4,728,169 | 3/1988 | Campbell et al. | 385/95 X |
| 4,746,195 | 5/1988 | Auracher et al. | 385/52 X |
| 4,758,061 | 7/1988 | Horn | 385/95 X |
| 4,792,206 | 12/1988 | Shuratovsky | 385/52 X |
| 4,834,484 | 5/1989 | Gorman et al. | 385/33 X |
| 4,834,485 | 5/1989 | Lee | 385/33 X |
| 4,875,756 | 10/1989 | Estes et al. | 385/24 X |
| 4,886,331 | 12/1989 | Peterson | 385/15 X |
| 4,896,935 | 1/1990 | Lee | 385/15 X |
| 4,923,269 | 5/1990 | Healey | 385/15 X |
| 4,927,221 | 5/1990 | Kiyono | 385/14 X |
| 4,952,010 | 8/1990 | Healey et al. | 385/15 X |
| 5,005,934 | 4/1991 | Curtiss | 385/15 X |
| 5,016,961 | 5/1991 | Aldrich | 385/15 X |
| 5,109,450 | 4/1992 | Johann et al. | 385/52 |
| 5,175,777 | 12/1992 | Bottle | 385/17 |
| 5,177,348 | 1/1993 | Laor | 250/201.1 |
| 5,353,362 | 10/1994 | Tucci | 385/27 |
| 5,353,363 | 10/1994 | Keck et al. | 385/46 |
| 5,383,118 | 1/1995 | Nguyen | 385/134 X |
| 5,436,987 | 7/1995 | Saito et al. | 385/16 |
| 5,440,654 | 8/1995 | Lambert, Jr. | 385/17 |
| 5,450,245 | 9/1995 | Grotzinger et al. | 359/822 |

*Primary Examiner*—Brian Healy
*Attorney, Agent, or Firm*—Sheridan Ross & McIntosh

[57] ABSTRACT

An optical fiber switching system is provided which includes two optically opposed groups of optical fiber switching units. The system is capable of rapidly aligning any one of the optical fibers in any one of the switching units in one group with any one of the optical fibers in any one of the switching units in the other group in response to a command from an exterior source. In one aspect of the invention, each optical fiber switching unit includes, on a single support chassis, one or more data carrying optical fibers and all associated circuitry for directing each fiber toward a predetermined target in response to an alignment signal and the timing portion of a pulsing signal. In another aspect of the invention, a novel alignment algorithm is implemented which provides for the alignment of two fibers in much less time than past switches. The optical fiber switching system of the present invention also includes a maintenance feature which allows the switch to be quickly and easily maintained in the field with minimal down time.

18 Claims, 10 Drawing Sheets

OPTICAL FIBER SWITCHING SYSTEM AND METHOD USING SAME

FIELD OF THE INVENTION

The invention relates to optical fiber communication systems, and, more particularly, to an improved optical fiber switching system capable of rapidly and accurately aligning any one of a first group of optical fibers with any one of a second group of optical fibers.

BACKGROUND OF THE INVENTION

Optical fiber technology is currently revolutionizing the telecommunications industry. Over the past decade, tremendous advances have been made in the field and all indications show that even greater advances will be made in the future. For example, one prediction estimates that in the relatively near term, systems will exist which are capable of carrying 10 million conversations simultaneously on a single fiber. Optical fiber communication systems offer many advantages over past systems, such as systems using copper wire or radio frequency links as a transmission medium, including: lower transmission losses, higher bandwidths, higher transmission rates, lower implementation costs, and greater electrical isolation characteristics. Because of these and other advantages, great efforts are currently being made to develop and implement optical fiber communication systems and such systems will most likely dominate the telecommunications industry in the near future.

An important component in any communication system is the switch which the system uses to establish communication channels among two or more of its interfaces. In optical fiber communication systems this function can be performed by an optical fiber switch. An optical fiber switch is a switch which is capable of optically connecting, or aligning, any one of a first group of optical fibers with any one of a second group of optical fibers so that an optical signal can propagate through the spaced junction from one fiber to the other. Such a switch should operate very rapidly and should be capable of aligning the two fibers in such a way that very little signal power is lost at the transition between the fibers.

Optical fiber switches generally include fiber positioning means, alignment signal emitter means and computer control means interconnected thereto. A fiber positioning means is provided near the end of each fiber to selectively point the end of a given fiber in one fiber group toward the end of a given fiber in the other fiber group for switched optical transmission therebetween. An alignment signal emitter means is provided near the end of and in predetermined spaced relation to the end of each fiber to emit an alignment signal for receipt and use in controlling the fiber positioning means when aligning the ends of selected fibers in the fiber groups for switched optical transmission therebetween. See e.g., the inventor's prior U.S. Pat. Nos. 4,512,036 and 5,177,348.

As optical fiber communication systems are developed to service larger numbers of customers, larger optical fiber switches will be necessary to accommodate switching between larger groups of fibers. Correspondingly, increased fiber alignment speeds and switch serviceability, as well as decreased signal power loss and overall switch complexity will be highly desirable. In this regard, current optical switch designs present limitations. For example, in one currently employed design, all of the alignment signal emitter means for a fiber group are mounted on a common support, thereby presenting a serviceability problem should any one of the alignment signal emitter means fail, and further making it increasingly difficult to achieve predetermined positioning of the alignment emitter signal means relative to corresponding fiber ends as the number of fibers in fiber groups increases. Deviations from the desired predetermined relative positioning can result in signal power losses across a switch junction. Additionally, the control means of current switches are pre-programmed with specific positional information for each potential fiber interconnection combination for use in controlling the fiber positioning means, thereby presenting computer pre-programming complexities and increased delays in processing as the number of fibers in fiber groups increases.

SUMMARY OF THE INVENTION

The present invention provides an improved optical fiber switching system which is capable of aligning any one of a first group of optical fibers with any one of a second group of optical fibers more rapidly than past systems. In addition to increased switching speed, the invention provides a system which is quickly and easily serviceable in the field, which reduces overall switch complexity, and which yields high signal power efficiencies during use. The invention will be particularly useful in large scale optical fiber communication systems.

The system includes a plurality of optical fiber switching units which are separated into two optically opposed groups. The switching units in each group are mounted in a support structure which holds them in fixed relation to one another. The system further includes a microprocessor communicating with each of the switching units. The microprocessor is operative for receiving commands from an exterior environment requesting that two specific fibers be aligned and for processing these commands by controlling the delivery and reception of alignment signals by the units.

Each switching unit includes one or more data carrying optical fibers, a set of radiation emitting devices (REDs) associated with each fiber, and a RED driver for pulsing the radiation emitting devices in a predetermined fashion in response to pulsing signals from the microprocessor to create alignment signals. In addition, each optical fiber switching unit further includes a two-axis piezoelectric bender, or similar device, operatively associated with each data carrying optical fiber and x and y controllers electrically connected to each bender. The controllers for each fiber are operative for processing alignment signals received from REDs of the opposing group to create error signals which are delivered to the corresponding bender. The bender then adjusts the position of the fiber in response to the error signals to more closely align it with a specific target optical fiber.

In one aspect of the present invention, the alignment of two fibers is accomplished strictly through use by the x and y controllers of the alignment signals emitted by opposing REDs and a portion of the pulsing signals provided to the opposing REDs. The invention employs alignment signals in algorithms in the x and y controllers to directly carry out the alignment of one or both of the fibers. In this regard, it is important to appreciate that the microprocessor only provides timing signals (as a portion of the opposing RED pulsing signals) to the x and y controllers for use in processing the alignment signals, thereby avoiding the need to preprogram the switch with any positional information for specific fiber combinations. Use of only the RED-emitted alignment and RED pulsing signals by the x-y controllers to control fiber alignment allows the system to align two fibers much more rapidly than past systems which for example utilize a microprocessor generated control signal to perform gross alignment and a RED-generated alignment signal responsive to an algorithm for fine alignment.

In another aspect of the present invention, the system is capable of being quickly and easily repaired whenever an element within any of the optical fiber switching units becomes inoperative. If such a contingency occurs, a user can simply remove the faulty unit from the system and replace it with a spare. The inoperative element may then be repaired or replaced without interrupting the provision of switching services.

Specifically, in this regard, the bender(s), x and y controller(s), REDs and RED driver(s) associated with the fiber(s) of each switching unit are all mounted in fixed relation upon a common chassis that is selectively and separately supportable on and removable from the support structure for the corresponding fiber group. Further, it is preferable that completely separate sets of REDs be associated with each switch fiber. In addition to the noted advantages, the described arrangement will also enhance the ability to establish the desired relative positioning between the end of a fiber and its associated REDs during assembly and will yield corresponding signal power efficiencies during use. Additionally, for switching units that comprise a plurality of fibers and associated REDs, it is preferable that a dual RED decoder/driver be utilized for receiving pulsing signals having a coded routing portion (in addition to a timing portion) from the microprocessor and directing it to the appropriate REDS. The implementation of such a decoding means yields further modularity advantages and reduces the number of necessary interconnections in the switch.

Other objects and advantages of the present invention will be apparent from the following description.

DETAILED DESCRIPTION

The present invention provides an improved optical fiber switching system which is capable of rapidly and accurately aligning any one of a first group of optical fibers with any one of a second group of optical fibers. In addition to its superior switching speed, the invention also has the advantage that it is easily serviceable in the field. The invention will be particularly useful in complex optical fiber communication systems which require large, easily serviceable optical fiber switches.

Figure 1:
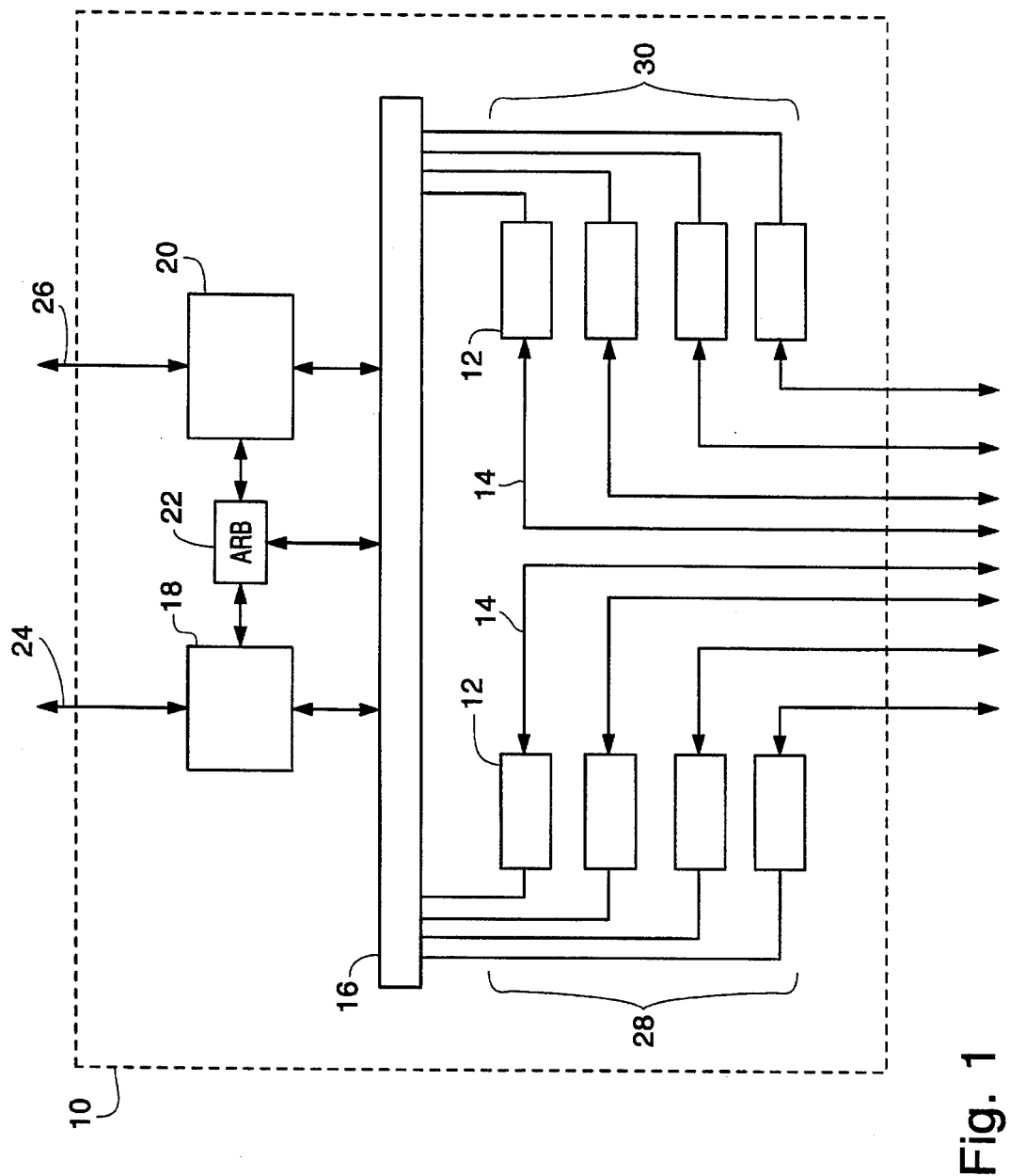
FIG. 1 is a block diagram of an embodiment of the optical fiber switching system of the present invention.

FIG. 1 is a block diagram of an embodiment of the optical fiber switching system 10 of the present invention. For convenience, the optical fiber switching system will hereinafter be referred to simply as system 10. With reference to the figure, system 10 includes a plurality of optical fiber switching units 12, each having one or more data carrying optical fibers 14 communicating, via coupled interconnections, with an exterior environment. The units 12 are each operatively connected to a bus 16 which, in turn, is operatively connected to both a primary microprocessor 18 and a secondary microprocessor 20. The system 10 also includes an arbitration unit 22 which is operatively connected to bus 16, as well as to both microprocessors 18 and 20. In addition, system 10 includes command signal inputs 24 and 26 for receiving command signals from an exterior environment and for delivering these command signals to primary and secondary microprocessors 18 and 20, respectively, for processing.

During normal operation, primary microprocessor 18 will have control of bus 16. It will use bus 16 for interfacing with the switching units 12 for purposes of processing switching commands received over command line 24. If primary microprocessor 18 malfunctions, arbitration unit 22 will detect this condition and turn control of bus 16 over to secondary microprocessor 20. Secondary microprocessor 20 will then use bus 16 to process commands it receives over command line 26. For purposes of convenience, the balance of this specification will only refer to primary microprocessor 18 unless discussion of secondary microprocessor 20 is specifically called for.

Figure 2A:
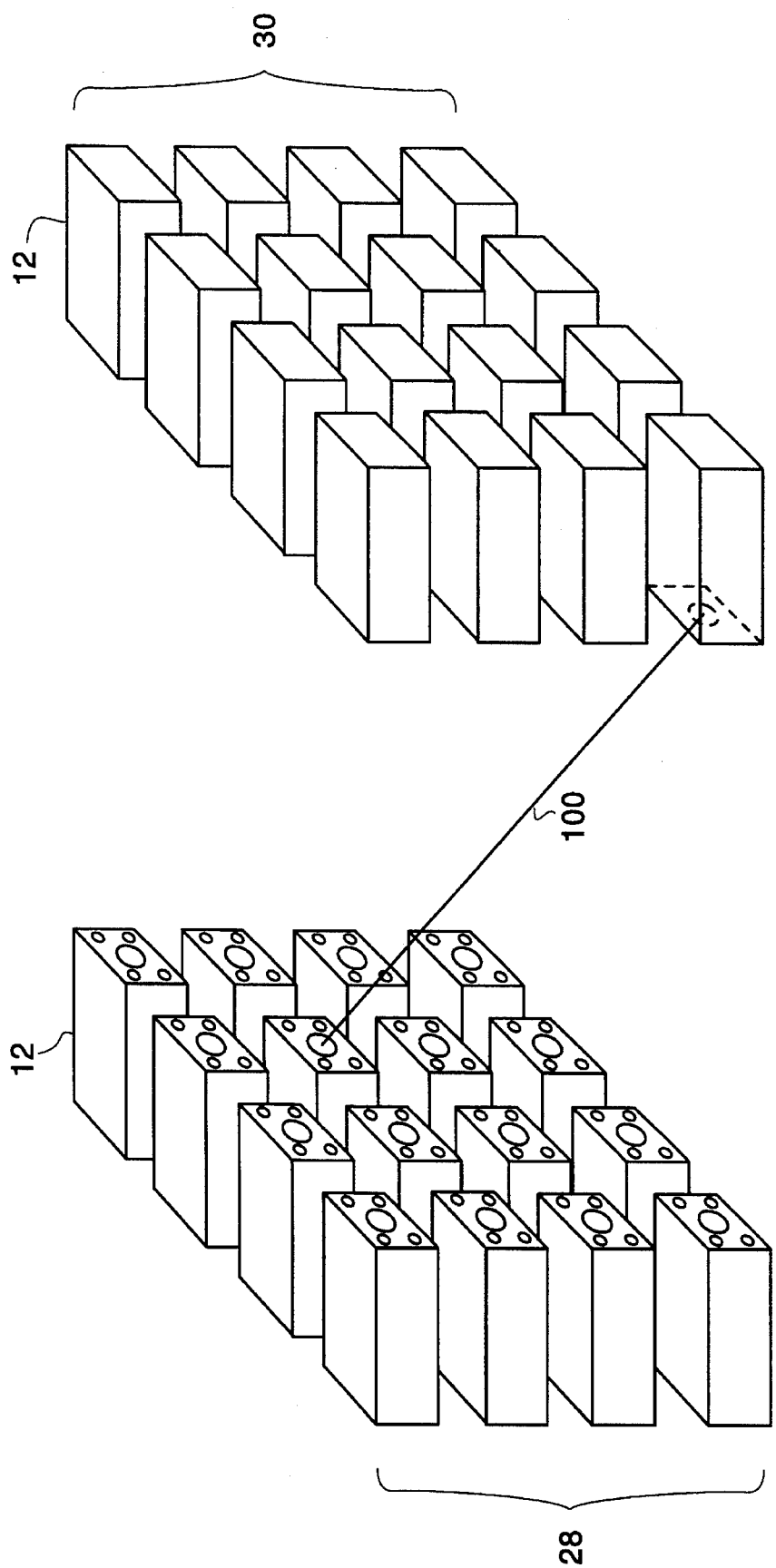
FIG. 2A is a perspective view of one possible arrangement of the optical fiber switching units of the present invention.
Figure 2B:
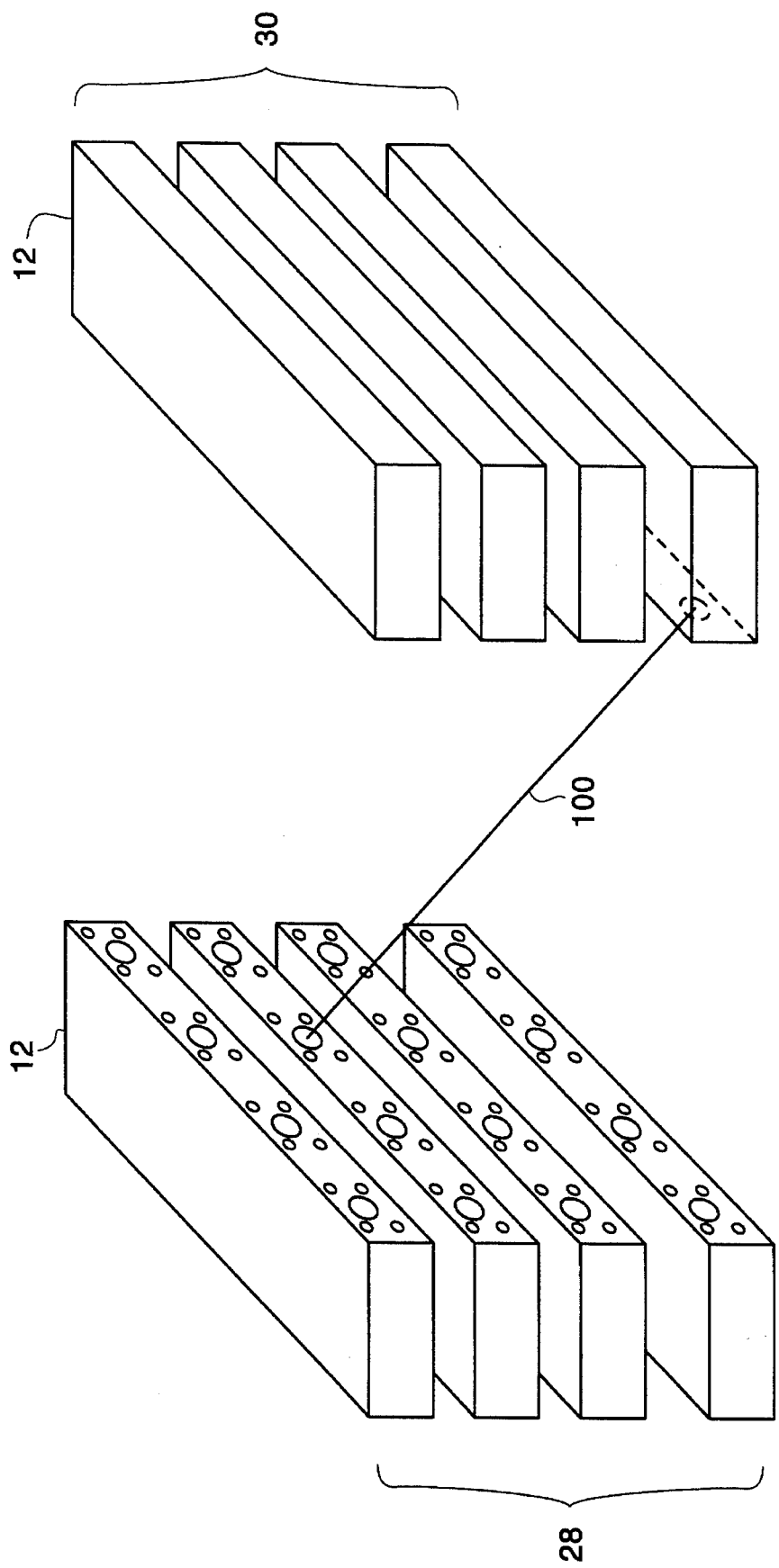
FIG. 2B is a perspective view of another possible arrangement of the optical fiber switching units of the present invention.

As illustrated in FIG. 1, the system 10 divides the plurality of optical fiber switching units 12 into two optically opposed groups 28, 30. This arrangement is better illustrated in FIGS. 2A and 2B which show two possible configurations of optical fiber switching units 12. FIG. 2A illustrates a switching unit configuration for a 16×16 switch having 16 single fiber switching units 12 in each group 28, 30. FIG. 2B illustrates a switching unit configuration for a 16×16 switch having four 4-fiber switching units 12 in each group 28, 30. Both figures illustrate a typical optical path 100 between fibers in the two groups 28, 30. It should be appreciated that system 10 is capable of having any number of optical fiber switching units 12 in each group 28, 30 and that the embodiments of FIGS. 2A and 2B are merely illustrative. It should also be appreciated that use of the phrase "optically opposed" with respect to the arrangement of the groups 28, 30 is meant to include any arrangement where optical signals transmitted from either group will impinge upon the other group and is not limited to the situation where the two groups are diametrically opposed. This phrase would include, for example, an arrangement where a mirror is placed in the optical path between the groups for creating a "folded optical path" which reduces the overall dimensions of the system 10.

Figure 3B:
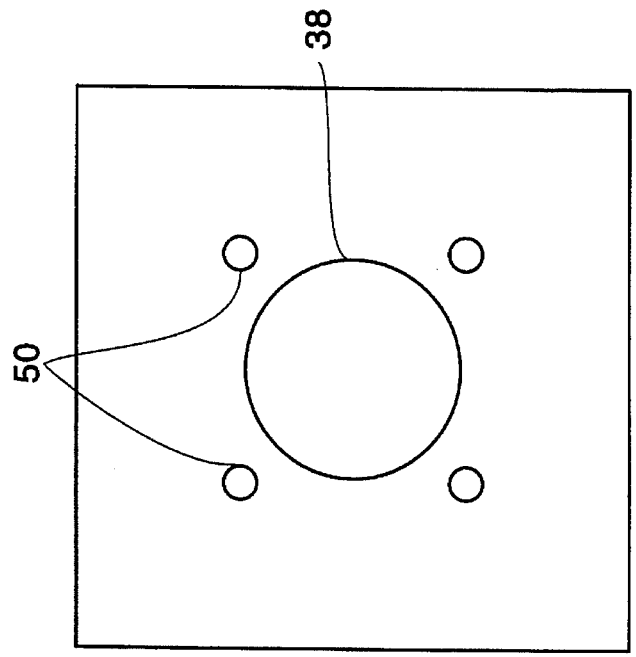
FIGS. 3A, 3B are block diagrams illustrating the contents of a single fiber switching unit.
Figure 3A:
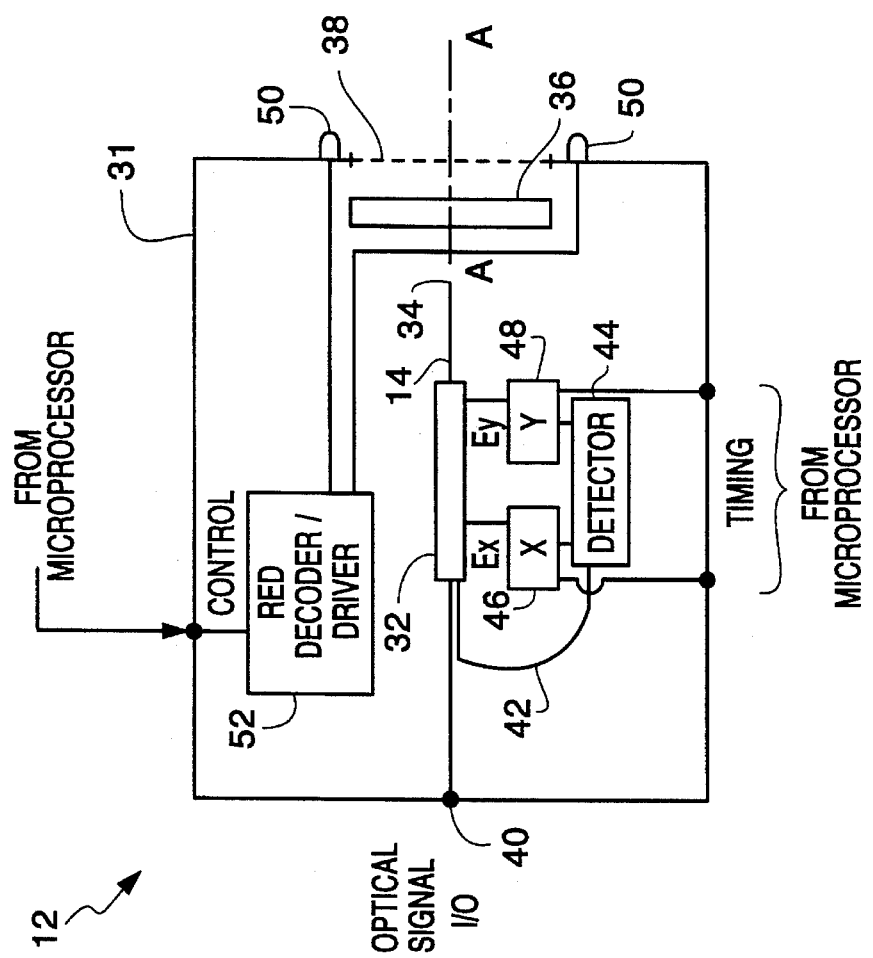

FIG. 3 illustrates the contents of one embodiment of a single fiber switching unit 12. It should be understood that multi-fiber switching units will have the same general components as the single fiber unit, but in quantities necessary to support the increased number of fibers. As illustrated in the figure, all components of switching unit 12 are contained on a single support chassis 31. The unit 12 includes a data carrying optical fiber 14 connected to a two-axis piezoelectric bender 32. The fiber 14 has an end 34 pointing substantially toward a beamforming lens 36. The piezoelectric bender 32 is capable of bending the fiber 14 away from a rest position on a stationary central axis A—A to a position where end 34 of fiber 14 is pointing toward a target fiber in the opposing group. Beamforming lens 36 is disposed adjacent to an aperture 38, which allows optical fiber 14 to transmit and receive optical signals to and from a target fiber external to unit 12, through lens 36. The stationary central axis A—A of fiber 12, if extended, intersects the center of aperture 38, as illustrated in FIG. 3A. As used in this specification, the phrase "target fiber" refers to a similar optical fiber configuration located in the opposing group to which optical fiber 14 is to be aligned. Optical fiber 14 is connected at another end to optical signal I/O port 40 for transmitting and receiving optical signals to and from an environment external to system 10.

Optical fiber switching unit 12 further includes radiation guide 42, optical detector 44, and x and y controllers 46 and 48. Radiation guide 42 is operative for receiving first alignment signals through aperture 38 and lens 36 and for delivering these first alignment signals to optical detector 44. Optical detector 44 detects the intensity of the received alignment signals and delivers signals indicative of this intensity to the x and y controllers 46, 48. The x and y controllers 46, 48 process the detected alignment signals according to an algorithm, using the timing portion of pulsing signals (for opposing REDs as will be further explained) received from microprocessor 18, to each create an error signal at an output. The controllers 46, 48 then deliver the error signals to the two-axis piezoelectric bender 32 to adjust the position of optical fiber 14 so that end 34 is pointing in a direction closer to the center of the aperture of the target fiber than it previously pointed.

In addition, optical fiber switching unit 12 also includes a set of radiation emitting devices (REDs) 50 and a RED decoder/driver 52 for facilitating the creation of second alignment signals for delivery to the target fiber. It should be appreciated that the second alignment signals are created in substantially the same way and perform substantially the same function as the first alignment signals, but operate with respect to the opposing group. As used herein, the expression "radiation emitting device" is meant to include such devices as light emitting diodes, laser diodes, and, most preferably, infrared-emitting diodes. The set of REDs is fixedly attached to an exterior surface of unit 12 with each RED pointing in substantially the same direction, away from the unit. The REDs are all positioned in fixed relation to aperture 38 to enable the target fiber to align with the center of aperture 38 in response to the second alignment signals. In one embodiment, four REDs are arranged in a square configuration around the perimeter of a circular aperture 38, with each RED being equidistant from the center of the aperture 38. It should be appreciated that, in a multifiber switching unit, REDs may be shared by adjacent fibers so that a single RED may be associated with two different fibers. It is preferred, however, that each fiber in system 10 have a separate and exclusive set of REDs associated with it.

The RED decoder/driver 52, which is electrically connected to each RED 50 in the set, is operative for receiving and decoding pulsing signals from microprocessor 18 designating, in a coded portion, a specific combination of REDs within the set which must be pulsed to facilitate creation of the second alignment signals and for pulsing this combination in response to the pulsing signals. Location of pulsing signal decoding means inside each unit greatly reduces the circuit complexities required to create the second alignment signals. For example, prior art optical switches ran a separate signal line from the microprocessor to each RED in the system for creating the alignment signals. The present invention only requires that enough signal lines be present between the microprocessor and each unit to fully define the limited number of RED pulsing combinations which will be required to create the alignment signals. It should be understood that a multifiber switching unit 12 may include a separate RED decoder/driver 52 for each data carrying optical fiber 14 in the unit or one RED decoder/driver 52 for all of the data carrying optical fibers in the unit 12, the latter case being preferable in that it reduces overall system complexity. In addition to sending the pulsing signals to the RED decoder/driver 52, microprocessor 18 also sends at least the timing portions of the pulsing signals to the unit containing the target fiber. The x and y controllers associated with the target fiber use the second alignment signals and the timing portion of the pulsing signals to adjust the position of the target fiber to more closely align with the center of aperture 38.

Figure 4A:
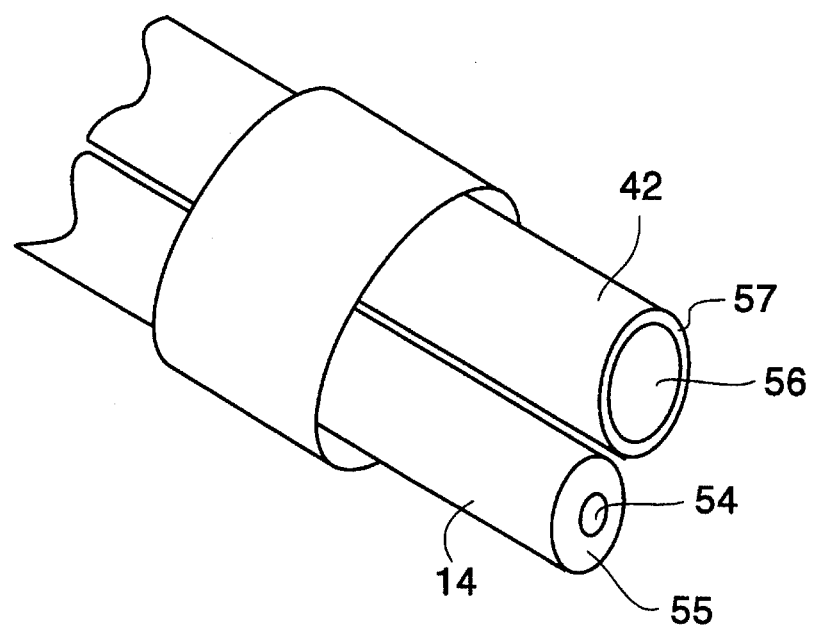
FIGS. 4A, 4B are perspective views of two possible arrangements of the radiation guide within the optical fiber switching units of the present invention.

Radiation guide 42 may be positioned in any one of a number of configurations within optical fiber switching unit 12. In one embodiment, as illustrated in FIG. 4A, the radiation guide 42 is comprised of a separate optical fiber attached in fixed relation to data carrying optical fiber 14. In this embodiment, data carrying optical fiber 14 includes a cylindrical core 54 with a concentric cladding 55 having an index of refraction less than that of core 54. Similarly, radiation guide 42 includes a cylindrical core 56 with a concentric cladding 57 having an index of refraction less than that of core 56.

Figure 4B:
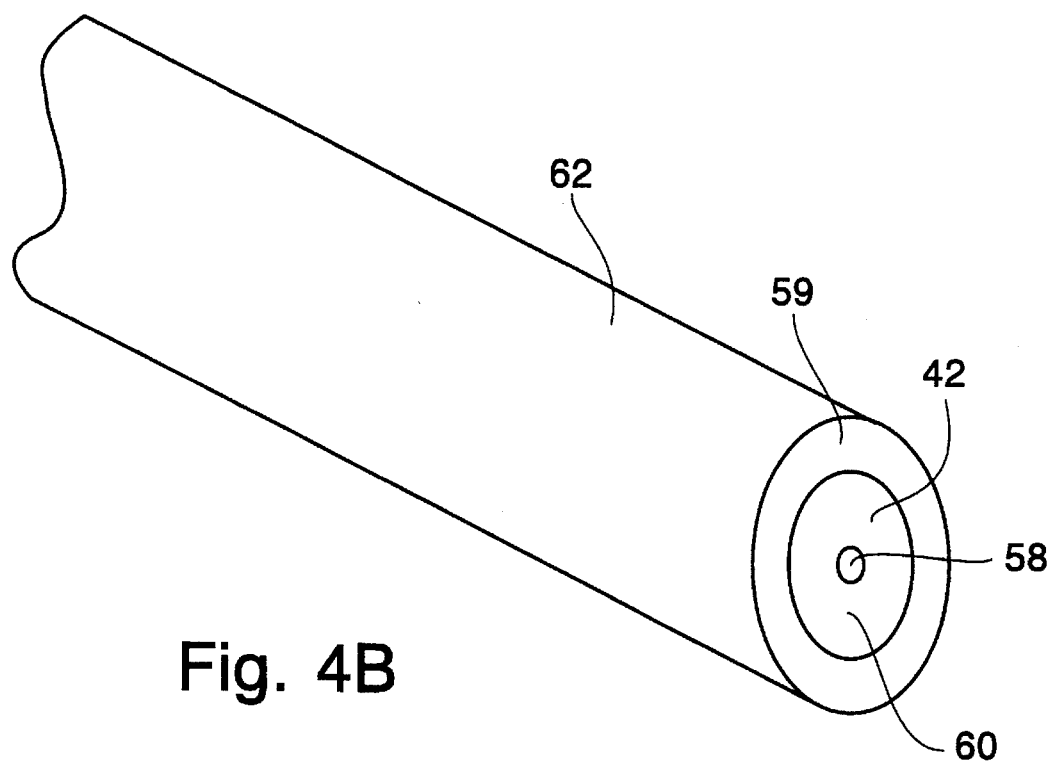

In another embodiment, as illustrated in FIG. 4B, radiation guide 42 is a part of the same fiber structure as data carrying fiber 14. As seen in the figure, the radiation guide 42 takes the form of a relatively wide, concentric multimode layer 60 sandwiched between the core 58 and the cladding 59 of composite fiber 62. Each successive layer of composite fiber 62, from the core outward, has a progressively lower index of refraction. In this embodiment, the data signal which is being switched propagates through the core 58 of composite fiber 62, and the received alignment signals propagate through multimode layer 60 to optical detector 44. Special cable tapping techniques must be used to extract the alignment signals from composite fiber 62 to provide it to the detector 44. The above two embodiments may also be implemented using graded index fibers.

Figure 5A:
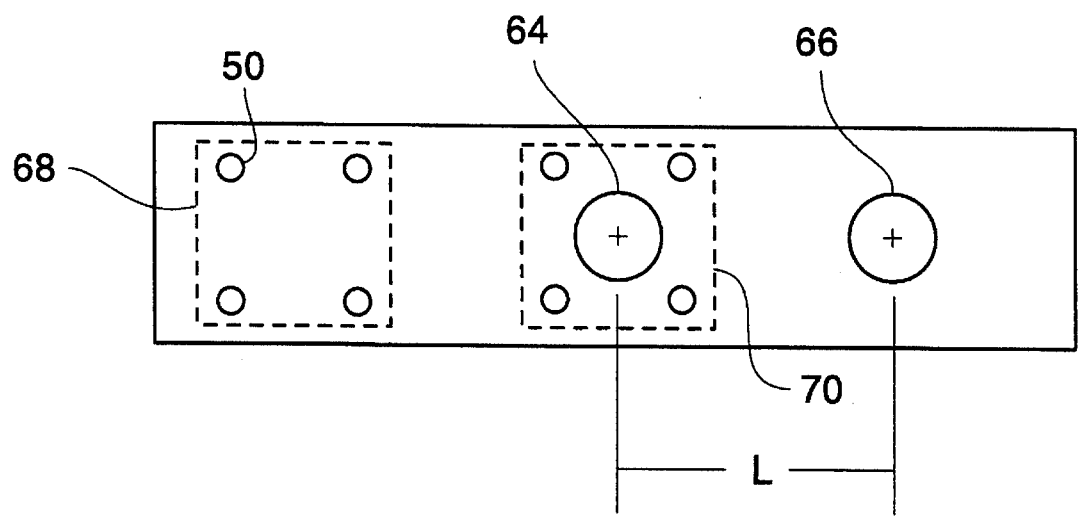
FIG. 5A is a front view of a 2 fiber switching unit comprising RED arrays having centers which are offset from the centers of their corresponding apertures.

As used herein, the word "array" is defined as any spaced arrangement of REDs where each RED is equidistant from a common center. In general, the set of REDs 50 associated with each fiber 14 will be arranged in the form of an array whose location with respect to the aperture 38 will depend upon which of the above mentioned radiation guide configurations is utilized. If the configuration of FIG. 4A is used, for example, the array of REDs will have a center which is offset from that of aperture 38. FIG. 5A illustrates such an arrangement for a unit 12 having 2 data carrying optical fibers. As seen in the figure, the unit has two apertures 64 and 66 and two corresponding RED arrays 68 and 70. The center of each of the arrays is offset from the center of the corresponding aperture by a full aperture spacing L. Although it is not required that the offset distance between the centers be equal to the aperture spacing L, this arrangement results in the most efficient use of space.

Figure 5B:
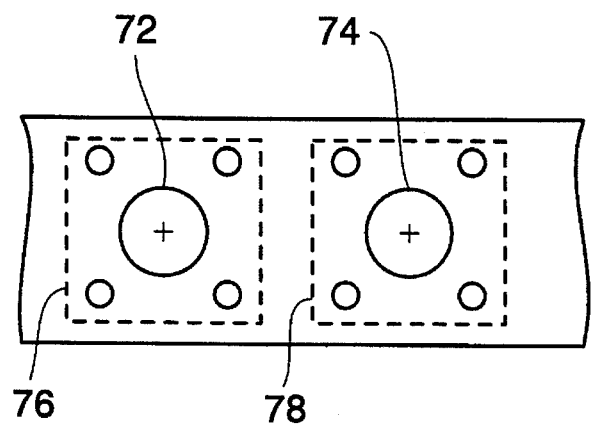
FIG. 5B is a front view of a 2 fiber switching unit comprising RED arrays having centers which are in registry with the centers of their corresponding apertures.

If the radiation guide configuration of FIG. 4B is used, the array of REDs will have a center which is in registry with the center of aperture 38. FIG. 5B illustrates such an arrangement for an optical fiber switching unit 12 having 2 data carrying optical fibers. As seen in the figure, the unit 12 has two apertures 72 and 74 and two corresponding RED arrays 76 and 78. The centers of the apertures are in registry with the centers of the corresponding arrays. In a system using single fiber switching units, the arrangement of FIG. 5B is highly preferred.

Regardless of the specific radiation guide configuration being used, the reception of the alignment signals by the radiation guide 42 will occur essentially as follows. Beamforming lens 36 creates an image of the entire face of the opposing group of switching units 12 in the focal plane of the lens. This image has a particular point associated with each RED in the opposing group. As the REDs in the opposing group are pulsed, the corresponding point in the image is similarly pulsed. The end 34 of the data carrying optical fiber 14 and the corresponding end of the associated radiation guide 42 are both located substantially within the focal plane of the lens 36. Therefore, the radiation guide 42 will receive an optical signal from a RED in the opposing group whenever that RED is pulsed. The intensity of the received signal will depend upon the proximity of the end of radiation guide 42 to the point in the image corresponding to the RED pulsed. If the end of the radiation guide is close to the point in the image, a relatively large intensity signal will be received. If the end of the radiation guide is far from the point in the image, a relatively small intensity signal will be received.

Figure 6:
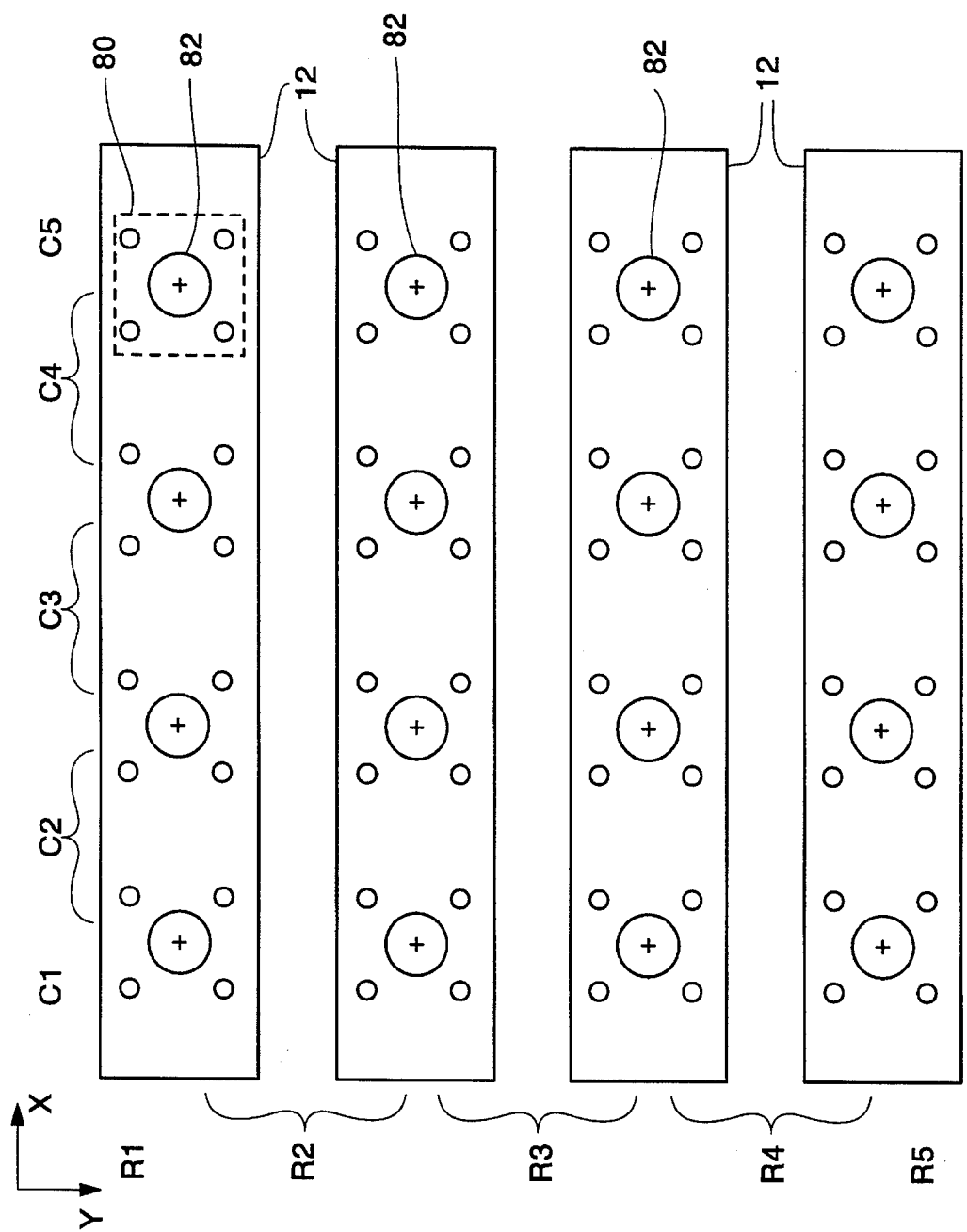
FIG. 6 is a front view of the optical fiber switching unit configuration of one of the groups illustrated in FIG. 2B.

FIG. 6 is a front view of the switching unit configuration of one of the groups illustrated in FIG. 2B. This group comprises four optical fiber switching units 12, each having four data carrying optical fibers. As shown in the figure, the four switching units 12 are arranged one on top of the other so that the four apertures in each unit 12 align in substantially vertical columns with the corresponding apertures in the other units. The four switching units 12 are also arranged relatively close to one another so that the aperture spacing between vertically adjacent apertures is minimized. As is apparent from the figure, the centers of the RED arrays 80 are in registry with the centers of the apertures 82, indicating that the radiation guide arrangement of FIG. 4B is being used. Each RED array in the embodiment of FIG. 6 is in the shape of a square having one RED in each corner and being horizontally/vertically aligned. Use of this arrangement of the REDs allows the switching units 12 to be of a smaller vertical dimension and results in an even further reduced aperture spacing between vertically adjacent apertures.

With reference to FIG. 6, the REDs of the illustrated embodiment are divided into five rows R1–R5 and five columns C1–C5. As seen in the figure, external rows R1 and R5 each consist of a single line of REDs, while internal rows R2, R3, and R4 each consist of a double line of REDs from two adjacent units 12. Similarly, external columns C1 and C5 each consist of a single line of REDs, while internal columns C2, C3, and C4 each consist of a double line of REDs. As will become apparent during the discussion of the operation of system 10, the above arrangement of the REDs in rows and columns is very important in one aspect of the present invention. It should be understood, however, that other arrangements of the REDs 50 may be used in the present invention.

Figure 7A:
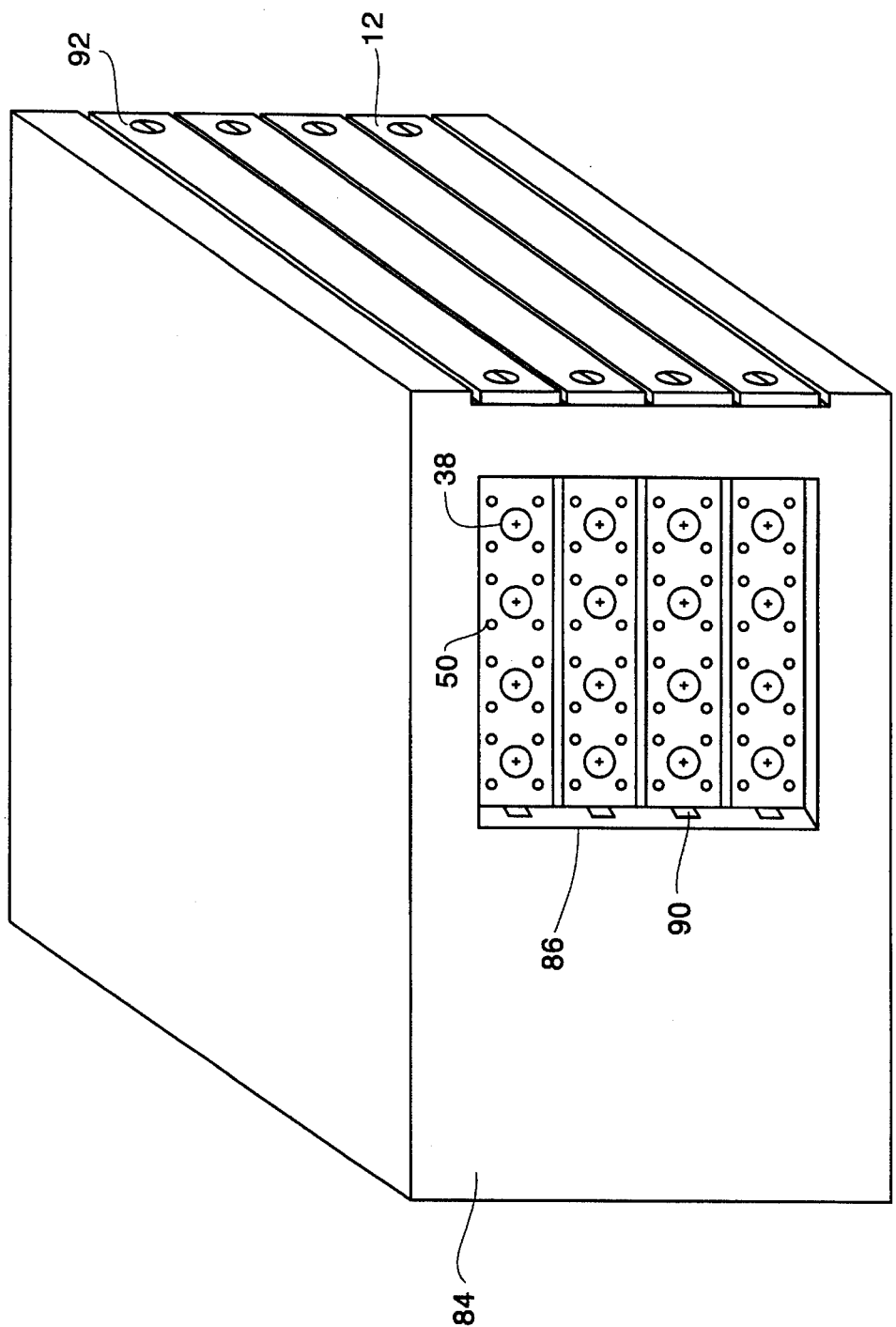
FIG. 7A is a perspective view of a portion of one embodiment of the present invention having four multifiber switching units mounted within a support structure.
Figure 7B:
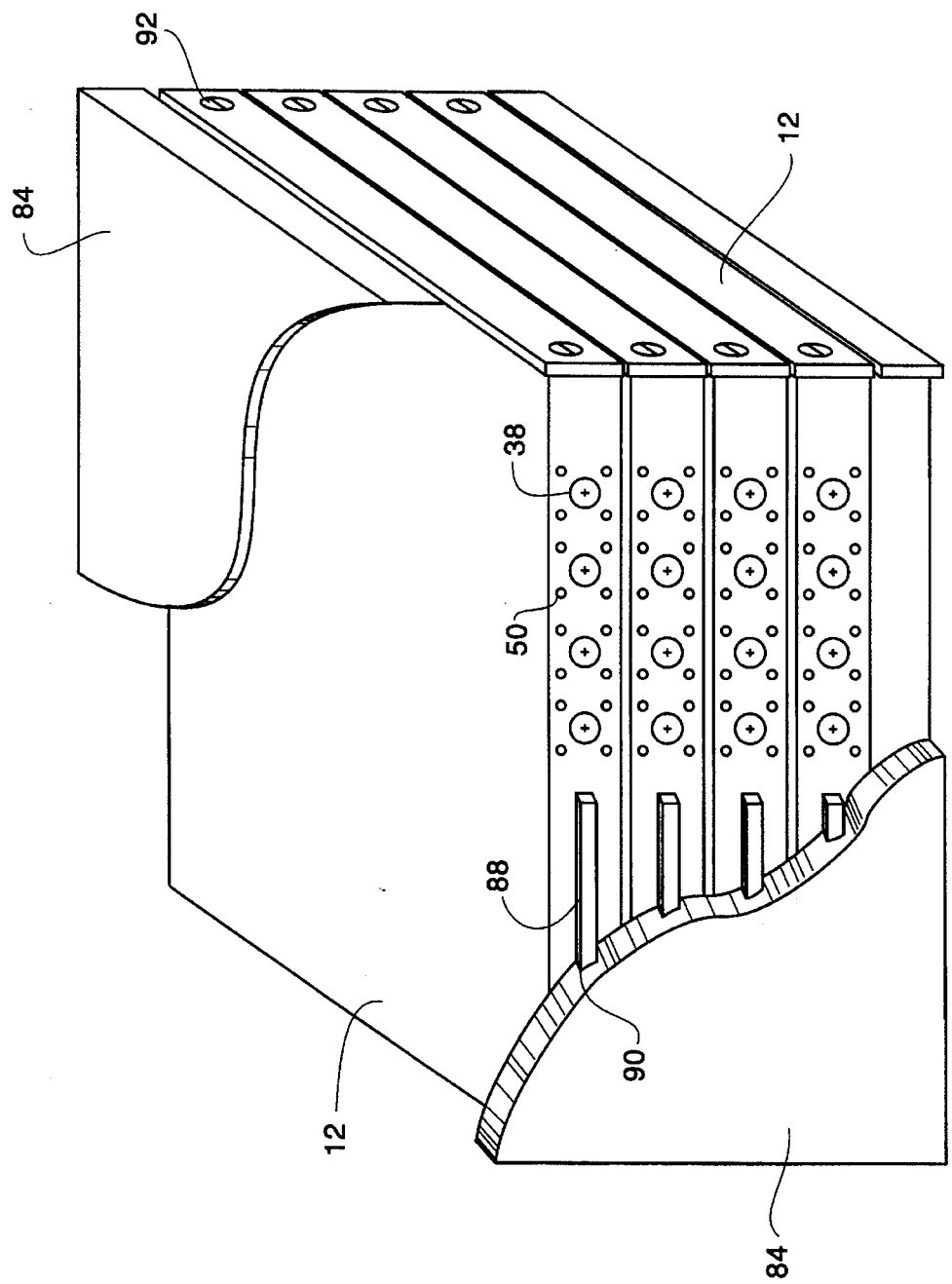
FIG. 7B is a partial sectional perspective view of the embodiment illustrated in FIG. 7A.
Figure 8:
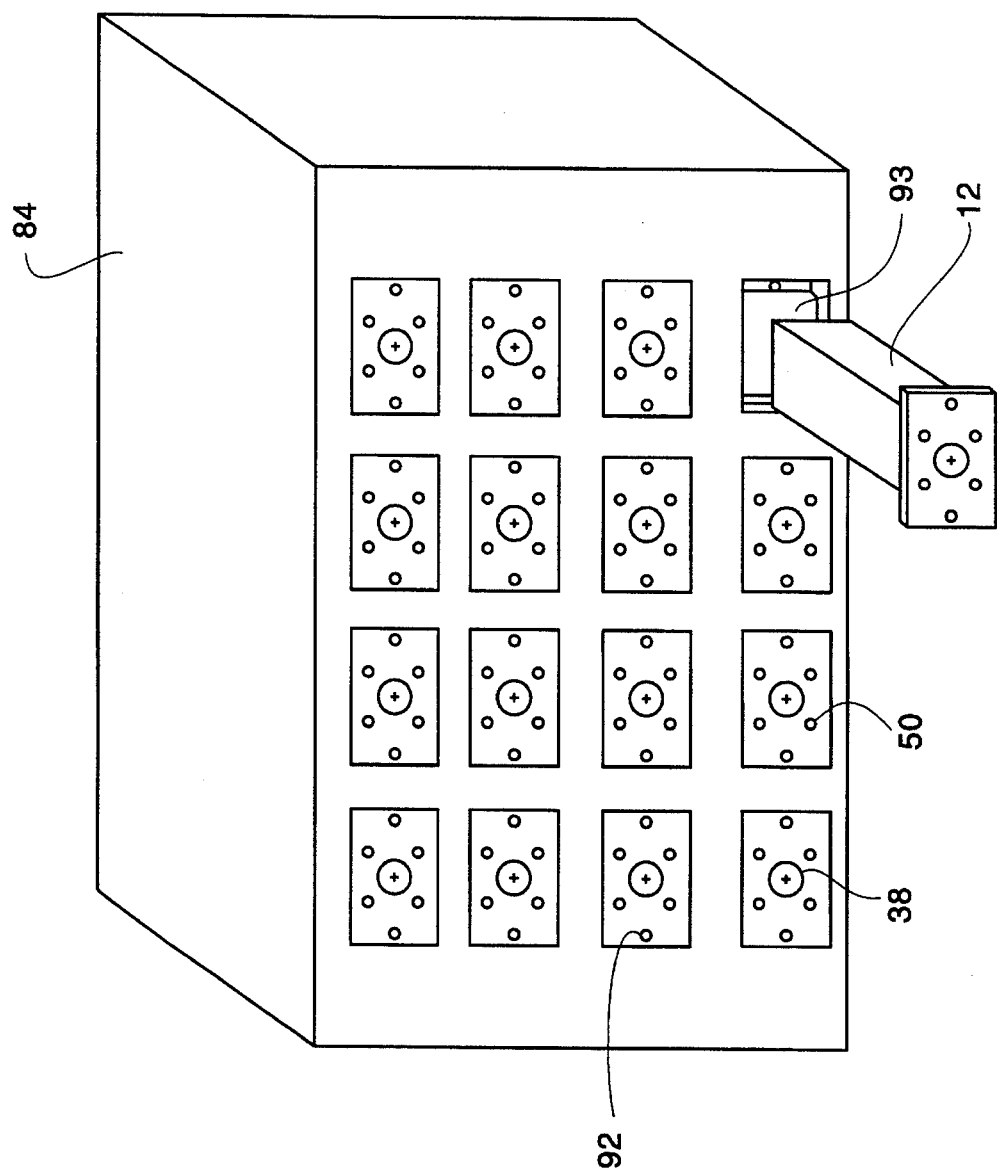
FIG. 8 is a perspective view of a portion of an embodiment of the present invention having sixteen single fiber switching units mounted within a support structure.

As illustrated in FIGS. 7A and 8, the optical fiber switching units 12 in each group are each separately and removably mounted in a support structure 84. In one embodiment, as seen in FIG. 7A, four 4-fiber switching units 12 are mounted in a structure 84 having an opening 86 through which the data carrying optical fibers 14 in the units 12 can communicate. FIG. 7B is a partial sectional view of the embodiment illustrated in FIG. 7A depicting how the units are arranged and held in place inside support structure 84. Each unit 12 includes rails 88 on two of its sides to engage grooves 90 in support structure 84 to hold the unit in a substantially fixed vertical position. In addition, each unit 12 includes fastening means 92 to fasten the unit in a substantially fixed horizontal position. It should be understood that alternative means of holding the units 12 in a substantially fixed position within support structure 84 may be employed in the present invention. It should also be understood that the number of units installed in support structure 84 and the number of data carrying optical fibers in each unit may vary, and that the 4 multifiber unit arrangement of FIGS. 7A and 7B is for illustration purposes only.

FIG. 8 illustrates another embodiment of the present invention wherein sixteen single fiber switching units 12 are mounted within a support structure 84. The units 12 slide into the support structure 84 through a plurality of openings 93 in the front face of the structure 84. The units are secured in place by fastening means 92 which hold the units in a substantially fixed position with respect to one another.

In both of the above mentioned embodiments, support structure 84 and switching units 12 can also include quick release connectors (not shown in the figures) which engage simply by pushing the unit 12 fully into the structure 84 and disengage by simply pulling the unit 12 out of the structure 84. These connectors can provide all necessary interconnections between each unit 12 and the overall system 10. Use of such an arrangement provides for quick and efficient maintenance and repair of system 10. For example, if a RED in one of the units 12 fails, a user simply removes that unit from support structure 84 and replaces it with a spare unit. In this way, use of system 10 is not lost while the faulty RED is being replaced. The fact that the REDs 50 associated with each fiber are carried by the unit containing that fiber is of particular importance to the maintenance feature of the present invention.

With the foregoing description of the components and structure of the present invention in mind, the operation of system 10 will now be described. With reference to FIG. 1, microprocessor 18 will receive a command from an exterior source over command line 24 requesting that a specific fiber in one group 28 be optically connected with a specific fiber in the other group 30. Microprocessor 18 will then process the command by independently and concurrently causing each of the selected fibers to point in the direction of the center of the aperture of the other fiber. This operation is known as the adjustment process. During the adjustment process, microprocessor 18 must communicate with the two optical fiber switching units 12 which contain the subject fibers over bus 16. After both fibers are pointing in the proper direction, the fibers are said to be "aligned" and a signal is permitted to propagate through the junction.

For purposes of convenience, the following description of the adjustment process will concern the adjustment of only one of the two fibers with the understanding that the other fiber will also have to be adjusted before alignment is achieved. The description will refer to the fiber whose position is being adjusted as the adjusting fiber and to the other fiber as the target fiber. The description of the adjustment process will be made with respect to a system 10 having the optical fiber switching unit configuration of FIG. 6. When describing the various components within the switching units 12, the reference numerals of FIG. 3 will be used.

During the adjustment process, microprocessor 18 will be communicating with the RED decoder/drivers 52 in the switching units 12 in the group containing the target fiber, causing the decoder/drivers 52 to pulse the REDs associated with the units 12 in a predetermined sequence. This pulsing of the REDs creates the alignment signals which are delivered to the group containing the adjusting fiber to be used to adjust the position of that fiber. With reference to FIG. 6, in one embodiment of the present invention microprocessor 18 creates the alignment signals by causing the RED decoder/drivers 52 to pulse all of the REDs in each row and column simultaneously, in the following sequence:

Row 1

Row 2

Row 3

Row 4

Row 5

Column 1

Column 2

Column 3

Column 4

Column 5.

This sequence is constantly repeated throughout the adjustment process.

At the same time that microprocessor 18 is communicating with the RED decoder/drivers 52 in the switching units in the group containing the target fiber to create the alignment signals, it will also be sending pulsing signals to the switching unit 12 containing the adjusting fiber indicating, in a timing portion, when each of the rows and columns of REDs in the other group are being pulsed and when the rows and columns immediately adjacent to the aperture of the target fiber are being pulsed. Inside the switching unit 12 containing the adjusting fiber, the pulsing signals are delivered to the x and y controllers 46, 48 associated with the adjusting fiber. The x and y controllers 46, 48 also receive the detected alignment signals which were received through aperture 38 by radiation guide 42 and processed by detector 44. The x and y controllers 46, 48 then process all of this received information to each produce an error signal which they supply to the two-axis piezoelectric bender to adjust the position of the adjusting fiber.

The process by which the x and y controllers 46, 48 produce the error signals will be described with reference to the embodiment of FIG. 6, but it should be understood that a similar process will be followed in a system 10 having any number of fibers in each group. The x controller will process the detected alignment signal data resulting from the pulsing of the columns C1–C5 to produce an error signal which will adjust the horizontal position of the adjusting fiber, while the y controller will process the detected alignment signal data resulting from the pulsing of the rows R1–R5 to produce an error signal which will adjust the vertical position of the adjusting fiber. For purposes of describing the production of the error signals, it will be assumed that the target fiber is the second fiber from the left in the second unit 12 from the top in the embodiment of FIG. 6. It should be appreciated that the following discussion is an example based on the above mentioned location of the target fiber and that the algorithms used in any particular case will depend on both the switching unit configuration involved and the location of the target fiber within that configuration.

In order to produce the horizontal error signal, the x controller 46 will process the detected column alignment data according to the algorithm:

$$\text{error}_x(\text{target}) = \max[I_{c1}, I_{c2}] - \max[I_{c3}, I_{c4}, I_{c5}]$$

where $I_{c1}$–$I_{c5}$ are the intensities of the received alignment signals when the corresponding columns were pulsed. As is apparent from the algorithm, the x controller 46 simply finds the greatest intensity signal produced in the radiation guide of the adjusting fiber from the pulsing of a column to the left of the target fiber and subtracts from that intensity the greatest intensity signal produced in the radiation guide of the adjusting fiber from the pulsing of a column to the right of the target fiber. The x controller uses the part of the timing portion of the pulsing signals from the microprocessor which indicates when the columns immediately adjacent to the aperture of the target fiber are being pulsed to keep track of whether the column currently being pulsed is to the left or right of the target fiber. The x controller uses peak detectors, or similar devices, to determine the greatest intensity signal received from each side of the target fiber.

Similarly, in order to produce the vertical error signal, the y controller 48 will process the detected row alignment data according to the algorithm:

$$\text{error}_y(\text{target}) = \max[I_{R1}, I_{R2}] - \max[I_{R3}, I_{R4}, I_{R5}]$$

where $I_{R1}$–$I_{R5}$ are the intensities of the received alignment signals when the corresponding rows were pulsed. As was done by the x controller 46, the y controller 48 simply finds the greatest intensity signal produced in the radiation guide of the adjusting fiber from the pulsing of a row above the target fiber and subtracts from that intensity the greatest intensity signal produced in the radiation guide of the adjusting fiber from the pulsing of a row below the target fiber. The y controller uses the part of the timing portion of the pulsing signals from the microprocessor which indicates when the rows immediately adjacent to the aperture of the target fiber are being pulsed to keep track of whether the row currently being pulsed is above or below the target fiber. The y controller also uses peak detectors, or similar devices, to determine the greatest intensity signal received from each side of the target fiber.

As is apparent from the above discussion, the algorithm used to determine the error signals in any particular case will be a function of the location of the target fiber. The following are general expressions for the horizontal and vertical error signals:

error$_x$=max[intensities from columns to left of target]–max[intensities from columns to right of target]

error$_y$=max[intensities from rows above target fiber]–max[intensities from rows below target fiber]

As the adjustment process continues, the position of the adjusting fiber will be incrementally adjusted until the adjusting fiber is pointing toward the center of the aperture of the target fiber with a high degree of accuracy and the error signals approach zero. Once both of the fibers have reached this state, the fibers are optically aligned and a data signal will be permitted to propagate through the junction. The adjustment process will continue for as long as the connection between the two fibers is required to ensure that the fibers remain properly aligned throughout the communication even in the presence of external disturbances such as mechanical vibration, movement mechanism relaxation, and temperature induced movement.

In one embodiment of the present invention, the adjustment process is hastened by placing a high gain amplifier between the x and y controllers 46, 48 and the two-axis piezoelectric bender 32 to add extra amplification to the error signals for a fixed period of time after initiation of the adjustment process. In this way, larger adjustments will be made by the adjusting fiber toward a position of alignment with the target fiber with each iteration of the adjusting process during the fixed period of time. After the fixed period of time has expired, finer adjustments will be made with each iteration of the adjusting process until alignment is achieved. A similar technique utilizes the same high gain amplifier arrangement, but instead of amplifying the error signals for a fixed period, the system amplifies them for a period of time which is terminated when the error signals being output by the x and y controllers are reduced below a specific value.

Although the present invention has been described in conjunction with its preferred embodiment, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. An optical fiber switch, comprising:

support means; and first and second groups of optical fiber switching units disposed in opposing relation by said support means, each of a plurality of the switching units in one of said first and second groups comprising:
   a support chassis selectively and separately supportable on and removable from said support means;
   one or more optical fibers, supportably mounted on said support chassis, each said fiber having a central axis in fixed relation to said support chassis;
   radiation responsive means corresponding with each said fiber, supportably mounted on said support chassis in fixed and predetermined relation to the end of the corresponding fiber, for receiving first alignment signals from the other one of said first and second groups and for generating first error signals in response thereto;
   bending means corresponding with each said fiber, supportably mounted on said support chassis in fixed and predetermined relation to the end of the corresponding fiber, for bending the end of the corresponding fiber in response to the corresponding error signals; and
   a set of radiation emitting devices corresponding with each said fiber, supportably mounted on said support chassis in fixed and predetermined relation to the central axis of the corresponding fiber, for emitting second alignment signals to the other one of said first and second groups;

wherein said fixed and predetermined relations for each of said plurality of switching units are maintained upon removal of any one or more of said plurality of switching units from said support means.

2. An optical fiber switch, as claimed in claim 1, wherein each of said sets of radiation emitting devices comprise separate radiation emitting devices from each of the other sets of radiation emitting devices.

3. An optical fiber switch, as claimed in claim 1, each of said plurality of switching units further comprising:

means, supportably mounted on said support chassis, for receiving first pulsing signals and correspondingly pulsing said radiation emitting devices in a predetermined manner in response to said first pulsing signals.

4. An optical fiber switch, as claimed in claim 3, wherein:

said first pulsing signals include a coded portion which designates a specific combination of REDs to be pulsed; and each of said means for receiving said first pulsing signals in each of said plurality of switching units further comprises decoding means, supportably mounted on said support chassis, for decoding said coded portions of said first pulsing signals.

5. An optical fiber switch, as claimed in claim 3, wherein:

each of said switching units in the other one of said first and second groups comprises:
   a support chassis selectively and separately supportable on and removable from said support means;
   one or more optical fibers, supportably mounted on said support chassis, each said fiber having a central axis in fixed relation to said support chassis;
   radiation responsive means corresponding with each said fiber, supportably mounted on said support chassis in fixed and predetermined relation to the end of the corresponding fiber, for receiving second alignment signals from said one of said first and second groups and for generating second error signals in response thereto;
   bending means corresponding with each said fiber, supportably mounted on said support chassis in fixed and predetermined relation to the end of the corresponding fiber for bending the end of the corresponding fiber in response to said corresponding error signals;
   a set of radiation emitting devices corresponding with each said fiber, supportably mounted on said support chassis in fixed and predetermined relation to the stationary central axis of the corresponding fiber for emitting first alignment signals to said one of said first and second groups; and
   means, supportably mounted on said support chassis, for receiving second pulsing signals and correspondingly pulsing said radiation emitting devices in a predetermined manner in response to said second pulsing signals;

wherein said fixed and predetermined relations for any one or more of said switching units are maintained upon removal of any one or more of said plurality of switching units from said support means.

6. An optical fiber switch, as claimed in claim 5, wherein:

each of said first and second pulsing signals include a timing portion which contains timing information regarding said second and first alignment signals, respectively;

each of said radiation responsive means corresponding with each said fiber in each said switching unit of said one of said first and second groups receives said first alignment signals and a timing portion of said second pulsing signals and uses only said first alignment signals and said timing portion of said second pulsing signals to generate said first error signals; and each of said radiation responsive means corresponding with each said fiber in each said switching unit of said other one of said first and second groups receives said second alignment signals and a timing portion of said first pulsing signals and uses only said second alignment signals and said timing portion of said first pulsing signals to generate said second error signals.

7. An optical fiber switch, as claimed in claim 1, wherein:
said first alignment signals are received continuously and said second alignment signals are emitted continuously during operation of the switch.

8. An optical fiber switch, as claimed in claim 5, further comprising:
a microprocessor for supplying said first and second pulsing signals.

9. An optical fiber switch, as claimed in claim 1, each of said optical fiber switching units further comprising:
slide members disposed upon opposing edges of said support chassis for slidably mounting each unit of each group into complementary channels provided on said support means, wherein each unit is maintained in fixed relation to each other unit in said group during operation of the switch.

10. An optical fiber switch, comprising:
first and second groups of optical fiber switching units disposed in opposing relation, each of the switching units in one of said first and second groups comprising:
one or more optical fibers;
bending means corresponding with each said fiber for bending the end of the corresponding fiber in response to first error signals;
radiation responsive means corresponding with each said fiber for receiving first alignment signals from the other one of said first and second groups, said first alignment signals being created in said other group in response to second pulsing signals, receiving a timing portion of said second pulsing signal, and generating said first error signals using only said first alignment signals and said timing portion of said second pulsing signals;
a set of radiation emitting devices corresponding with each said fiber for emitting second alignment signals to said other of said first and second groups; and
means for receiving first pulsing signals and correspondingly pulsing said radiation emitting devices in a predetermined manner in response to said first pulsing signals.

11. An optical fiber switch, as claimed in claim 10, wherein:
each of the switching units in the other one of said first and second groups comprises:
one or more optical fibers;
bending means corresponding with each said fiber for bending the end of the corresponding fiber in response to second error signals;
radiation responsive means corresponding with each said fiber for receiving first alignment signals from said one of said first and second groups, said first alignment signals being created in said one of said first and second groups in response to first pulsing signals, receiving a timing portion of said first pulsing signals, and generating said second error signals using only said second alignment signals and said timing portion of said first pulsing signals;
a set of radiation emitting devices corresponding with each said fiber for emitting first alignment signals to said one of said first and second groups; and
means for receiving second pulsing signals and correspondingly pulsing said radiation emitting devices in a predetermined manner in response to said second pulsing signals.

12. An optical fiber switch, comprising:
first and second groups of optical fiber switching units disposed in opposing relation;
each of said switching units in said second group comprising:
one or more optical fibers; and
a set of radiation emitting devices corresponding with each fiber for emitting first alignment signals to said first group;
said switching units in said second group being arranged such that the radiation emitting devices associated with each said switching unit are aligned in columns and rows with the radiation emitting devices associated with the other switching units in the second group;
said first alignment signals being created by continuously and alternately pulsing said columns and rows of radiation emitting devices in said second group, said columns being sequentially pulsed from left to right and said rows being sequentially pulsed from top to bottom;
each of said switching units in said first group comprising:
one or more optical fibers;
radiation responsive means corresponding with each said fiber for receiving said first alignment signals from said second group and for generating first error signals in response thereto, said radiation responsive means including:
means for finding a first maximum intensity received as part of said first alignment signals resulting from the pulsing of a column of radiation emitting devices to the left of a target fiber in said second group;
means for finding a second maximum intensity received as part of said first alignment signals resulting from the pulsing of a column of radiation emitting devices to the right of said target fiber in said second group;
means for finding a third maximum intensity received as part of said first alignment signals resulting from the pulsing of a row of radiation emitting devices above said target fiber in said second group;
means for finding a fourth maximum intensity received as part of said first alignment signals resulting from the pulsing of a row of radiation emitting devices below said target fiber in said second group;
means for determining a difference between said first maximum intensity and said second maximum intensity; and
means for determining a difference between said third maximum intensity and said fourth maximum intensity; and
bending means corresponding with each said fiber for bending the end of the corresponding fiber in response to said first error signals.

13. An optical fiber switch, as claimed in claim 14, wherein:
each of said switching units in said first group further comprises:
a set of radiation emitting devices corresponding with each said fiber for emitting second alignment signals to said second group;
said switching units in said first group being arranged such that the radiation emitting devices associated with each said switching unit are aligned in columns and rows with the radiation emitting devices associated with the other switching units in the first group;
said second alignment signals being created by continuously and alternately pulsing said columns and rows of radiation emitting devices in said first group, said columns being sequentially pulsed from left to right and said rows being sequentially pulsed from top to bottom;

each of said switching units in said second group further comprising:

radiation responsive means corresponding with each said fiber for receiving said second alignment signals from said first group and for generating second error signals in response thereto, said radiation responsive means including:

means for finding a first maximum intensity received as part of said second alignment signals resulting from the pulsing of a column of radiation emitting devices to the left of a target fiber in said first group;

means for finding a second maximum intensity received as part of said second alignment signals resulting from the pulsing of a column of radiation emitting devices to the right of said target fiber in said first group;

means for finding a third maximum intensity received as part of said second alignment signals resulting from the pulsing of a row of radiation emitting devices above said target fiber in said first group;

means for finding a fourth maximum intensity received as part of said second alignment signals resulting from the pulsing of a row of radiation emitting devices below said target fiber in said first group;

means for determining a difference between said first maximum intensity and said second maximum intensity; and means for determining a difference between said third maximum intensity and said fourth maximum intensity; and bending means corresponding with each said fiber for bending the end of the corresponding fiber in response to said second error signals.

14. An optical fiber switch, as claimed in claim 13, wherein:

each said means for finding a maximum intensity includes a peak detector.

15. An optical fiber switch, as claimed in claim 13, wherein:

each said means for determining a difference includes a differential amplifier.

16. A method of aligning an optical fiber with an optically opposed target selected out of a plurality of optically opposed targets, comprising:

providing a matrix of radiation emitting devices associated with said plurality of targets;

sequentially pulsing said matrix of radiation emitting devices associated with said plurality of targets by row and by column to create an alignment signal;

receiving said alignment signal in a radiation guide associated with said optical fiber;

finding a first maximum intensity received in said radiation guide resulting from the pulsing of a column to the left of said selected target;

finding a second maximum intensity received in said radiation guide resulting from the pulsing of a column to the right of said selected target;

creating a horizontal error signal using said first maximum intensity and said second maximum intensity;

finding a third maximum intensity received in said radiation guide resulting from the pulsing of a row above said selected target;

finding a fourth maximum intensity received in said radiation guide resulting from the pulsing of a row below said selected target;

creating a vertical error signal using said third maximum intensity and said fourth maximum intensity;

moving said fiber in response to said horizontal and said vertical error signals so that said fiber is more closely aligned with said target; and repeating the above steps until alignment is achieved.

17. A method, as claimed in claim 16, wherein:

said step of creating said horizontal error signal includes:
finding a difference between said first maximum intensity and said second maximum intensity; and said step of creating said vertical error signal includes:
finding a difference between said third maximum intensity and said fourth maximum intensity.

18. An optical fiber switching system, comprising:

a first group of one or more optical fiber switching units;

a second group of one or more optical fiber switching units optically opposed to said first group;

a support structure separately and supportably engaging said units in said first group for holding said units in fixed relation to one another;

a support structure separately and supportably engaging said units in said second group for holding said units in fixed relation to one another; and a first microprocessor communicating with each of said optical fiber switching units in said first and second group for controlling the delivery of timing control signals to said units;

each said optical fiber switching unit in each one of said first and second groups comprising:

a chassis;

one or more optical fibers for carrying optical signals to and from an exterior environment, said optical fibers being located on said chassis;

bending means associated with each said fiber for bending said fiber in response to one or more error signals so that one end of said fiber points toward a predetermined target in the other one of said first and second groups, said bending means being located on said chassis;

radiation responsive means associated with each said fiber for receiving and detecting a first alignment signal from said other group, said radiation responsive means being located on said chassis;

control means responsive to said first alignment signal for creating said one or more error signals, said control means being located on said chassis;

a plurality of radiation emitting devices (REDs) associated with each said fiber for creating a second alignment signal for delivery to said predetermined target in the opposing group, said plurality of radiation emitting devices being located on said chassis; and means for pulsing said plurality of REDs in a known sequence in response to a timing control signal, said pulsing means being located on said chassis;

wherein said system is capable of aligning any one of said optical fibers in said first group with any one of said optical fibers in said second group.

* * * * *